United States Patent
Demoise, Jr. et al.

(10) Patent No.: US 6,478,122 B1
(45) Date of Patent: Nov. 12, 2002

(54) DISC BRAKE

(75) Inventors: Thomas Edwin Demoise, Jr., Osceola, IN (US); Glenn Gustave Brown, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/079,867

(22) Filed: Feb. 21, 2002

(51) Int. Cl.$^7$ ................................................ F16D 65/02
(52) U.S. Cl. .................................. 188/73.38; 188/73.36
(58) Field of Search ........................... 188/1.11 R, 72.3, 188/73.31, 73.36–73.38

(56) References Cited

U.S. PATENT DOCUMENTS

| | | | |
|---|---|---|---|
| 5,934,417 A | * 8/1999 | Kobayashi et al. | 188/72.3 |
| 5,947,233 A | * 9/1999 | Kobayashi et al. | 188/72.3 |
| 6,003,642 A | * 12/1999 | Mori et al. | 188/73.44 |
| 6,223,866 B1 | * 5/2001 | Giacomazza | 188/73.38 |
| 6,269,915 B1 | * 8/2001 | Aoyagi | 188/73.38 |
| 6,378,666 B1 | * 4/2002 | Yoko | 188/73.38 |

* cited by examiner

Primary Examiner—Christopher P. Schwartz
(74) Attorney, Agent, or Firm—Leo H. McCormick, Jr.; Warren Comstock

(57) ABSTRACT

A disc brake having an anchor member with first and second grooves that receive first and second ears on a backing plate to align a friction surface of a friction pad with a rotor. A first slipper spring is secured to the anchor and located between the first groove and the first ear. A second slipper spring is secured to the anchor and located between the second groove and the second ear. The first and second ears correspondingly slide on the first and second slipper springs in response to an input force being applied to move the backing plate toward a rotor to bring the friction surface into engagement with the rotor during a brake application. Each of the first and second slipper springs is characterized by a base with parallel top and bottom side walls that extends therefrom. The top side wall has a lip thereon that engages the anchor to position the base in a groove. The bottom side wall has an arm that extends therefrom along a plane that forms an angle of less than 90 degrees with respect to the base and second wall. The arm tangentially engages a single point contact on the backing plate to resiliently urge the ears away from the grooves to define a first gap between the ear and the base of each slipper and to resiliently urge the ear into engagement with the top side wall to define a second gap between the ear and the bottom side wall such that the backing plate slides in the first and second slipper springs without binding while a radial component of the tangential resilient engagement attenuates movement of the backing plate caused by vibration of the backing plate.

4 Claims, 2 Drawing Sheets

DISC BRAKE

This invention relates to a slipper spring for linearly and radially resiliently retaining a friction pad within first and second grooves in anchor of a disc brake.

BACKGROUND OF THE INVENTION

Anchors for disc brakes are often manufactured through a casting process wherein molten metal is poured into a die to define a broad general shape and later surfaces involved in the functional operation of the anchor such as pin bores, guide surfaces, alignment surfaces and etc, are finished to a smooth surface. The guide surfaces on the anchor include grooves that receive ears on backing plates that carry friction pads and surfaces that are mated with surfaces on a vehicle to align the grooves in a manner to provide for perpendicular engagement of the friction pads with a rotor. This type anchor functions in a disc brake in an adequate manner, however, after an extended period of time grooves. This wear has an effect on a smooth movement of the backing plate toward the rotor for an individual brake and may be sensed by operator as a non-synchronized brake application. The wear can be expected since the anchor and backing plate are made of different metals that have different coefficients of friction and coefficient of thermal expansion. With respect to thermal expansion a sufficient tolerance is always required between an ear on the backing plate and groove in the anchor or binding will occur under certain thermal operating conditions. As a consequence, a minimum manufacturing tolerance is essential between the components for operating under a wide range of thermal conditions. In order to reduce or control the wear between components it is common to line the groove with a cap having an equivalent or lower coefficient of friction than the backing plate. Unfortunately, this change in structural components also increased the minimum tolerances necessary to avoid thermal binding and as a result a spring was expediently added to resiliently urge the ear into engagement with the cap to attenuate the development of noise between the components when a vehicle travels on a rough roadway.

SUMMARY OF THE INVENTION

A primary object of the present invention is to provide an anchor plate for a disc brake with integral slipper springs that are located in grooves to resiliently axially align a backing plate retained between the grooves with a rotor and resiliently radially urge ears on the backing plate into engagement with a corresponding side wall of the grooves to absorb and dampen movement caused when a vehicle travels on a rough road.

According to this invention, then anchor member which is fixed to a support member on a vehicle has first and second grooves that correspondingly receive first and second ears on a backing plate. A first slipper spring is secured to the anchor and located between the first groove and the first ear and a second slipper spring is secured to the anchor and located between the second groove and the second ear. The first and second ears engage the corresponding first and second slipper springs to hold and align a friction surface on a friction pad attached to the backing plate with a rotor. The first and second ears correspondingly sliding in first and second slipper springs in response to an input force being applied to move the backing plate toward the rotor and the friction surface into engagement with the rotor to effect a brake application. Each of the first and second slipper springs is characterized by a base having parallel first and second side walls that extends therefrom. The first wall has a lip thereon that engages the anchor to position the base adjacent the bottom of one of the first and second groove. The second wall has an arm that extends from a point along a plane that forms an angle of less than 90 degrees with respect to the base and the wall. The arm tangentially engages the backing plate to resiliently urge the ear away from base groove to define a first gap between the ear and the base and to resiliently urge the ear into engagement with the first wall to define a second gap between the ear and the second wall. The first and second gaps function to reduce the possibility of binding that may occur as a result of differences in thermal expansion of the anchor and backing plate.

An advantage of this disc brake resides in a smooth actuation during a brake application resulting from a resiliently axially, radially and tangentially retained backing plate.

A still further advantage of this disc brake resides in a quite structure wherein noise caused by vibration is absorbed by a radial component of a tangential spring force provided by a cantilever arm that extends from a slipper liner for an aligning groove of an anchor.

DETAILED DESCRIPTION

Figure 1:
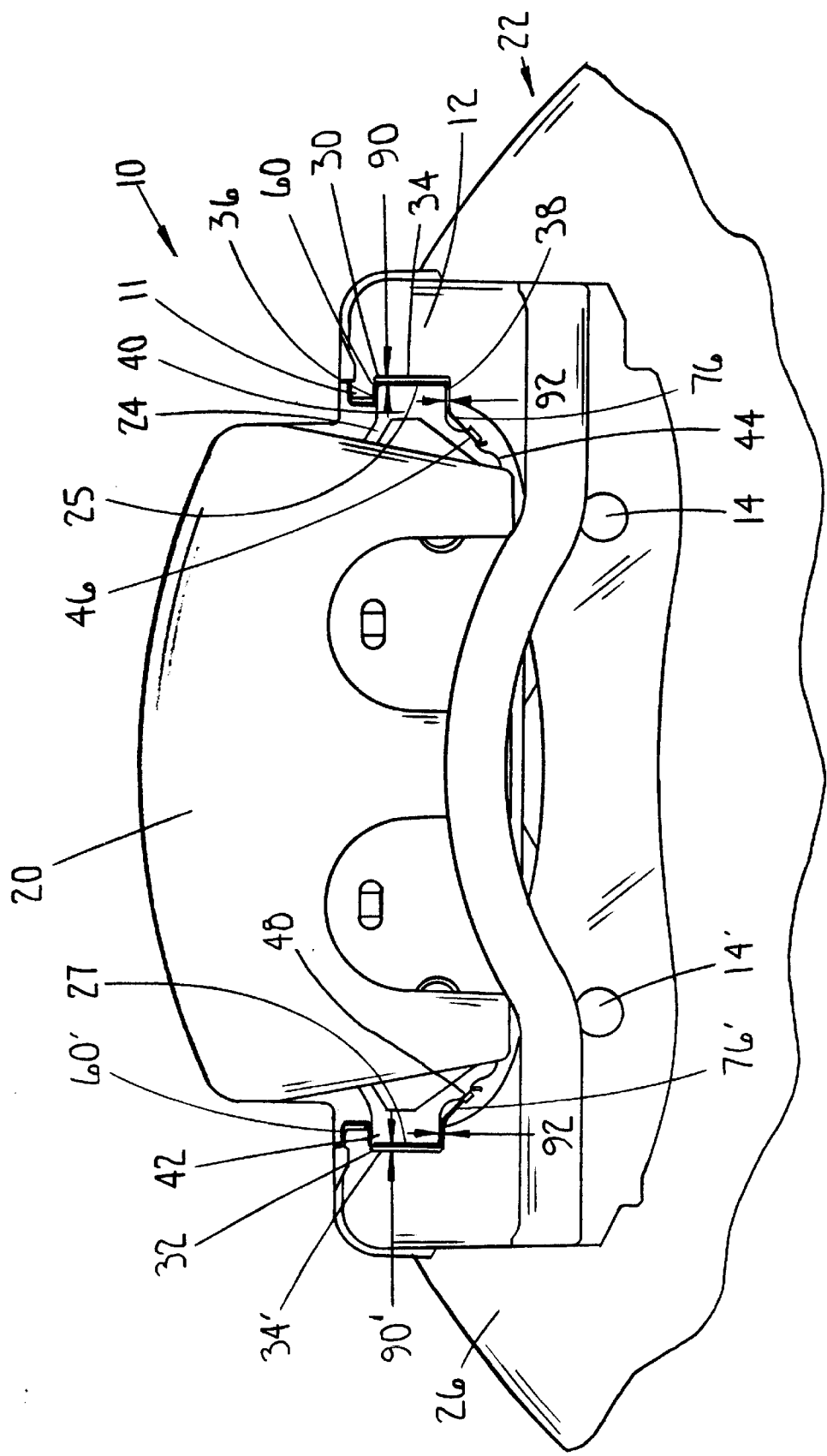
FIG. 1 is a view of a disc brake showing a relationship between first and second ears on a backing plate and first and second slipper springs made according to the present invention.

The disc brake 10 illustrated in FIG. 1 for use in a vehicle is known in the prior art and is of a type disclosed in U.S. patent application Ser. No. 09/991,617 filed Nov. 16, 2001 and now U.S. Pat. No. 6,378,666. The disc brake 10 includes an anchor 12 that is fixed to a vehicle by bolts 14,14' and a caliper 20 that is carried by a plurality of guides that slide in bores in the anchor 12. When an operator desires to effect a brake application, pressurized fluid is supplied to an actuation chamber located in the caliper 20. The pressurized fluid supplied to the actuation chamber acts on a piston (not shown) to move a first backing plate (not shown) toward a rotor 22 and bring a first friction pad (not shown) into engagement with a first face on the rotor 22 and acts the caliper 20 to move a second backing plate 24 toward the rotor 22 to bring a second friction pad (not shown) into engagement with a second face 26 on the rotor 22 to effect a brake application.

The anchor 12 is characterized by a first groove 30 and a second groove 32 that are aligned in a perpendicular relationship with face 26 on rotor 22 by bolts 14,14'. Grooves 30 and 32 have an identical shape that includes a base 34 and parallel first 36 and second 38 side walls. Grooves 30 and 32 are designed to receive ears 40 and 42 that extend from the first backing plate and the second backing plate 24 to guide and maintain the friction pads carried by the backing plates 24 in a parallel relationship with rotor 22.

The first and second 24 backing plates are identical in structure and in addition to ears 40 and 42 each have an undulating peripheral surface 44 that extend from the first ear 40 to the second ear 42 with a first apex 46 located adjacent the first ear 40 and a second apex 48 located adjacent the second ear 42.

Figure 2:
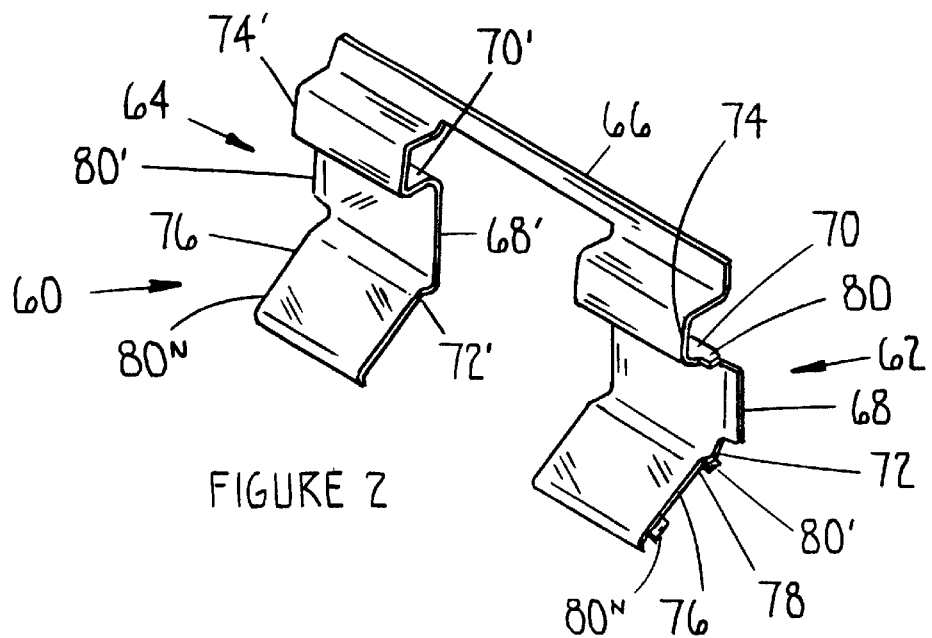
FIG. 2 is a perspective view of a slipper spring.

Each of the grooves 30 and 32 are lined or covered by identical slipper springs 60,60'. The structural description of slipper spring 60 that is best illustrated in FIG. 2 and described hereinafter is also applicable for slipper spring 60' and as a result in the drawings similar number plus ' are used to identify like features. Slipper spring 60 has a first section 62 separated from a second section 64 by a spacer 66. The first section 62 and second section 64 are identical and have a base 68 with parallel and perpendicular top or first 70 and bottom or second 72 side walls that extends therefrom. The top or first side wall 70 has a rectangular lip 74 on the end thereof while the bottom or second side wall 72 has an arm 76 that extends therefrom at a point 78 along an inward plane toward the axis of rotor 22 that forms an angle of approximately 45 degrees with the bottom or second side wall 72. The slipper spring 60 also has a plurality of tabs 80, 80' . . . 80'' one of which is located on the top or first side wall 70, bottom or second side wall 72 and arm 76.

The functional feature of slipper spring 60 that is located in grooves 30 and slipper spring 60' that is located in groove 32 are also identical and connected to anchor 12 in a following manner as more clearly illustrated with reference to FIG. 3. Rectangular lip 74 of slipper 60 is pushed onto ledge 11 on anchor 12 to position base 68 against the bottom of base 34 of groove 30, to position the top or first side wall 70 against the top of side wall 36 and to position the bottom or second side wall 72 adjacent the bottom of side wall 38. Tabs 80,80' on the first section 62 and tabs 80,80' on the second section 64 engage anchor 12 to aid in aligning and retaining the slipper spring 60 in a fixed location on the anchor 12 as well as to facilitate servicing of the brake pads.

The first and second backing plates 24 with the friction pads located thereon are mounted in the anchor 12 such that a first ear 40 is located in slipper 60 and second ear 42 is located in slipper 60'. The physical size of each backing plate 24 is such that the arcuate length between face 25 on ear 40 to face 27 on ear 42 is less than the length along a same arcuate line from the base 34 of grooves 30 and base 34' of groove 32. Similarly the radial height of ear 40 and ear 42 has a length that is less than a radial height or length between the top or first side wall 36 and the bottom or second side wall 38 of grooves 30 and 32. The difference in dimension length is determined by the compositions of matter from which anchor 12, slipper 60 and backing plate 24 are made such that a maximum thermal expansion in any or all would not cause binding. When the ears 40 and 42 are located in grooves 30 and 32, arm 76 on slipper 60 engages the apex 46 and arm 76' on slipper 60' engages apex 48 to position the backing plate 24 in groove 30 and 32 such that a first lineal gap 90 is defined between face 25 and base 68 of slipper 60 and a second lineal gap 90' is defined between face 27 and base of slipper 60'. The first gap 90 and the second gap 90' are equal in width and are maintained through the horizontal component of, the resilient force developed by the cantilever arms 76,76'. Similarly, the radial component of the resilient force of arm 76 on slipper 60 acts on ear 40 to hold ear 40 against the top or first side wall 70 of slipper 60 and of arm 76' of slipper 60' acts on ear 40' to hold ear 40' against the top or first side wall 70' of slipper 60' to define a first radial gap 92 between ear 40 and the bottom or second side wall 38 of groove 30 and a second radial gap 92' between ear 42 and the bottom or second side wall 38 of groove 32. Thus, only the top of ears 40, and 42 touch the corresponding top or first walls 70,70' and as a result any thermal expansion is directed into linear gaps 90,90' and radial gaps 92,92' in a manner to minimize any binding.

MODE OF OPERATION OF THE INVENTION

In a vehicle in which disc brake 10 is installed and during periods when no braking is desired, slipper springs 60 and 60' hold the backing plates 24 in a centered position as illustrated in FIG. 1. The first and second linear gaps 90,90' are equal and any coefficient of thermal expansion will have an equal effect of all components. Thus, sliding movement of the first and second backing plates 24 toward the rotor 22 in response to pressurized fluid being presented to the actuation chamber in the caliper 20 to effect a brake application will not be adversely effected. During a brake application, ear 40 of backing plate 24 slides on the top or first side wall 70 of slipper 60 and ear 42 of backing plate 24 slides on the top or first side wall 70' of slipper 60' as the backing plate 24 moves toward rotor 22. When the leading edge of the friction pad carried by backing plates 24 engages rotor 22, face 25 or 27 (depending on the rotational direction of rotor 22) engages the base 68 of corresponding slipper 60 or 60' to transfer torque into the anchor 12 during the brake application. When the pressurize fluid supplied to the actuation chamber ceases, the force created by the action of resilient arms 76,76' of the slipper springs 60, 60' acts through apex's 46 and 48 to return the backing plate 24 to a centered position between grooves 30 and 32, as illustrated in FIG. 1.

When the vehicle is moving and traveling over rough surfaces, vibration can be introduced into the disc brake 10. In this situation, the radial component of the resilient force produced by the cantilever arms 76 attenuated any noise by resiliently holding the ears 40 and 42 against the top or first side walls 70,70' of the slipper springs 60,60'.

The slipper springs 60,60' are designed to function by axially and radially resiliently retaining a backing plate 24 within first 30 and second 32 grooves in an anchor 12 of a disc brake 10 to maintain a uniform clearance between the components and thereby prevent binding caused by thermal expansion while attenuating noise caused by vibration.

Figure 3:
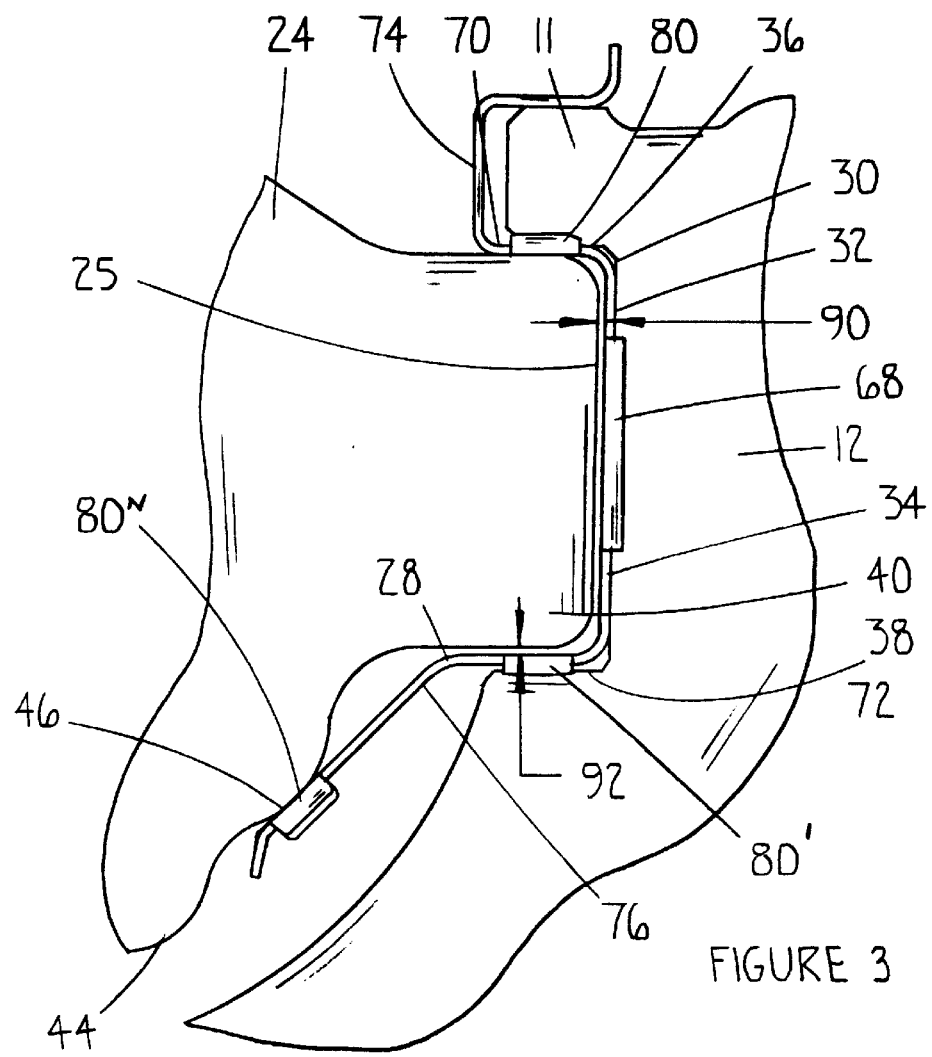
FIG. 3 is an enlarged view showing the relationship of the slipper spring and friction pad of FIG. 1.

The angle of the cantilever arms 76 as shown in FIGS. 1 and 3 is about 45 degrees. This 45 degree angle is based on a brake assembly-mounting angle as an angle of 0 degrees or 90 degrees would not urge a friction pad in a combined tangential and radial direction simultaneously with an angle of contact. The simultaneous direction of loading provides a means for vibration attenuation in a range of brake assembly vehicle mounting angles. Thus, in selecting an angle of 45 degrees, the radial and axial components of a resulting resilient force will be equal and a smooth brake application is achieved.

The tangential engagement between the arm 76,76' and backing plate 24 is achieved through the undulating peripheral surface 44 on backing plate 24 and flat surface on arm 76 but the surfaces could be reversed and a similar result would be achieved.

We claim:

1. A disc brake having an anchor member with first and second grooves that correspondingly receive first and second ears on a backing plate to align a friction surface on a friction pad with a rotor, a first slipper spring that is secured to said anchor and located between said first groove and said first ear and a second slipper spring that is secured to said anchor and located between said second groove and said second ear, said first and second ears correspondingly sliding in said first and second slipper springs in response to an input force being applied to move said backing plate toward a rotor and said friction surface into engagement with said rotor to effect a brake application, each of said first and second slipper springs being characterized by a base having parallel first and second side walls that extends therefrom, said first wall having a lip thereon engages said anchor to position said base in one of said first and second grooves, said second wall having an arm that extends from a point along a plane that forms an angle of less than 90 degrees with respect to said base and said second wall, said arm tangentially engaging a single point of contact on said backing plate to resiliently urge said ear both radially and tangentially simultaneously away from said groove to define a first gap between said ear and said base and to resiliently urge said ear into engagement with said first wall to define a second gap between said ear and said second wall.

2. The disc brake as recited in claim 1 wherein said first gap produced between said ear and said second wall in each of said first and second grooves is substantially equal in width such that sliding of said first and second ears in response to an input force is achieve without binding that may occur because of differences in thermal expansion of said anchor and said backing plate.

3. The disc brake as recited in claim 2 wherein said second gap produced between said ear and said second wall in each of said first and second grooves is substantially equal in width and allows for a smooth movement of the backing plate toward said rotor during a brake application while a radial force component of the tangential engagement reacts to attenuate any movement introduced into said backing plate in an absence of a brake application.

4. The disc brake as recited in claim 3 wherein such that said angle of the plane for the arm is about 45 degrees such that a resulting radial and linear component of said tangential engagement are equal.

* * * * *